United States Patent [19]

Lew

[11] 4,180,650

[45] Dec. 25, 1979

[54] NITROTHIOPHENE-ACCELERATED LACTAM POLYMERIZATION

[75] Inventor: Henry Y. Lew, El Cerrito, Calif.

[73] Assignee: Chevron Research Company, San Francisco, Calif.

[21] Appl. No.: 898,604

[22] Filed: Apr. 21, 1978

[51] Int. Cl.$^2$ .............................................. C08G 69/20
[52] U.S. Cl. ................................... 528/313; 528/315; 528/324; 528/326
[58] Field of Search ........................... 260/78 P, 78 L; 528/313, 315

[56] References Cited

U.S. PATENT DOCUMENTS 3,721,652   3/1973   Barnes ................................. 260/78 P

OTHER PUBLICATIONS

U.S.P., 3,094,511, cols. 1-2.
U.S.P., 3,230,196, cols. 1-2.

Primary Examiner—Harold D. Anderson
Attorney, Agent, or Firm—D. A. Newell; T. G. DeJonghe; Lawrence S. Squires

[57] ABSTRACT

Processes for the anionic polymerization of lactam accelerated by the presence of nitrothiophene and certain derivatives thereof. The processes are especially applicable to the preparation of poly-2-pyrrolidone which can be molded into filaments, films, and shaped articles in general.

25 Claims, No Drawings

NITROTHIOPHENE-ACCELERATED LACTAM POLYMERIZATION

BACKGROUND OF THE INVENTION

1. Field of the Invention

This invention relates to improved polymerization processes for the polymerization of lactams which are conducted in the presence of nitrothiophene and/or certain derivatives thereof which accelerate the polymerization. In a further aspect, this invention relates to accelerator compositions comprising such nitrothiophene compounds.

2. The Prior Art

Polylactams, such as poly-2-pyrrolidone (nylon-4) and polycaprolactam (nylon-6), are produced by the anionic (alkaline-catalyzed) polymerization of the lactam. The catalyst usually used comprises the reaction product of a lactam with an alkali metal, or quaternary ammonium hydroxide, or a source of alkali or alkaline earth metal, such as the hydroxide or alkoxide. The reaction product is generally recognized to be a lactamate, e.g., a salt, such as potassium pyrrolidonate, the product of the reaction between potassium and 2-pyrrolidone, having the formula:

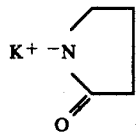

The salt consists of a cationic species such as $K^+$, $Na^+$, $Ca^{++}$, $N(CH_3)_4^+$, etc., depending on the source of the catalyst, and an anionic species which can be a pyrrolidonate ion, a caprolactamate ion, etc. depending on the choice of lactam. Polymerization initiators and/or activators can be present during the polymerization reaction.

Various polymerization process have been suggested by the prior art, one of which is disclosed in U.S. Pat. No. 3,721,652, in which carbon dioxide is used as an activator for the polymerization of pyrrolidone. This patent also states that although it is preferable to use carbon dioxide as the sole activator, that other activators could also be used in combination with carbon dioxide.

As with most commercial processes, it would be desirable to increase the polymerization rate, thus reducing the size of the process equipment capacity and processing time required. One of the problems with polymerization accelerators is that they frequently cause an inferior, very low-molecular-weight polymer to be produced. Accordingly, it has now been discovered that by the use of certain nitrothiophene compounds, the rate of polymerization can be substantially increased, without substantially affecting polymer quality.

BRIEF SUMMARY OF THE INVENTION

In summary, the process of the present invention comprises polymerizing a mixture of lactam, anionic catalyst an activator (e.g. carbon dioxide) and a catalytically effective amount of 2-nitrothiophene, alkyl derivatives thereof, or mixtures thereof.

In summary, another process of the present invention comprises polymerizing a mixture of lactam, anionic catalyst, a polymerization activator, e.g., carbon dioxide, a catalytically effective amount of 2-nitrothiophene, and/or alkyl derivatives thereof, and an amount of a tetra(lower alkyl) ammonium halide effective to increase the molecular weight of the polymer product without substantially reducing the rate of polymerization.

FURTHER DESCRIPTION OF THE INVENTION AND PREFERRED EMBODIMENTS

In the present process a mixture comprising the desired lactam monomer, anion catalyst, an activator, e.g., carbon dioxide, and a catalytically effective amount of certain 2-nitrothiophene compounds or mixtures thereof is polymerized. Although broadly described as a catalytically effective amount, the 2-nitrothiophene compound more specifically acts as an accelerator increasing the polymerization rate.

The 2-nitrothiophene compounds which can be used in the present process are nitrothiophenes and alkyl-2-nitrothiophenes and can be conveniently represented by the following generic formula

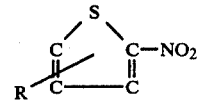

wherein R is hydrogen or lower alkyl having 1 through 4 carbon atoms, and can be attached at the 3, 4 or 5-position of the thiophene ring.

Suitable 2-nitrothiophene compounds which can be used include, for example, 2-nitrothiophene; 3-methyl-2-nitrothiophene; 4-methyl-2-nitrothiophene; 5-ethyl-2-nitrothiophene; 3-n-propyl-2-nitrothiophene; 4-isopropyl-2-nitrothiophene; 5-n-butyl-2-nitrothiophene; 3-t-butyl-2-nitrothiophene, and the like. Also, mixtures of different 2-nitrothiophene compounds can be used. Generally, it is preferred to use 2-nitrothiophene, since it affords very good results and is relatively inexpensive as compared with the other 2-nitrothiophene compounds.

The 2-nitrothiophene compounds are generally known compounds and can be obtained from commercial sources or prepared by known procedures or obvious modifications thereof (e.g., substitution of appropriate substrates and solvents).

Typically about from 0.005 to 1%, preferably about from 0.01 to 0.5% by weight, based on the total lactam, of the 2-nitrothiophene compound is used. Lower amounts of the 2-nitrothiophene compound are generally ineffective to produce a significant increase in the polymerization rate, and higher amounts produce very low molecular weight polymers which have inferior properties. Best results are typically obtained using about from 0.01 to 0.2 weight percent, based on total lactam.

Polymerization Conditions

The polymerization process of this invention is applicable to the polymerization of lactams under anionic polymerization conditions, i.e. alkaline catalyzed polymerization. Also, as is well recognized by the art, the polymerization should preferably be conducted under substantially anhydrous conditions. The process is generally applicable to the polymerization of lactams having from 5 through 13 atoms in their rings and is especially applicable to the polymerization of 5–7 membered-ring lactams, such as, for example, the polymerization of epsilon-caprolactam to polycaprolactam (nylon-6) and the polymerization of 2-pyrrolidone to poly-2-pyrrolidone (nylon-4). The process is especially preferred for the polymerization of 2-pyrrolidone, since it affords good yields of high molecular weight poly-2-pyrrolidone in relatively short polymerization times. The polymer can be made into film and shaped articles in general by molding or extrusion. The polymer can also be melt-spun, wet-spun or dry-spun into filaments having substantial orientation along the filamentary axes, high tensile strength, and other properties desirable for textile fibers. This is especially important since the primary commercial use for polymers such as nylon-4 and nylon-6 is as synthetic fibers.

The anionic catalyst used in the present process is typically and conveniently a lactamate salt. This catalyst can be conveniently prepared by the reaction of a lactam with a compound having an alkaline reaction, such as for example, alkali metal hydroxides, alkaline earth metal hydroxides, alkali metal alkoxides, alkali metals, etc. Preferably, an alkali metal, or a source of alkali metal or alkaline earth metal is used. Most preferably, an alkali metal hydroxide such as potassium hydroxide or sodium hydroxide is used, and potassium hydroxide is most preferred. Also, a different lactamate can be used as the catalyst than the lactam which is polymerized. Obviously, however, for process convenience it is preferred to use the same lactam for both.

The polymerization mixture used in the present process contains a catalytic effective amount of the anionic catalyst (e.g., the lactamate salt), usually about from 0.5–30 mol percent, preferably about 1–20 mol percent, based on total lactam. In accordance with the present invention, the polymerization mixture is polymerized in the presence of a catalytically effective amount, typically about from 0.005 to 0.3 weight percent, preferably about from 0.01 to 0.1 weight percent, based on monomer, of the nitrothiophene compound. Best results are obtained by activating the polymerization mixture by the addition of carbon dioxide and/or sulfur dioxide. The polymerization mixture can also contain a suitable inert organic solvent, but typically it is preferred to merely use excess lactam.

In a preferred embodiment of this invention, illustrating, for convenience, the polymerization of pyrrolidone, an alkali metal hydroxide is added to excess 2-pyrrolidone in an amount about from 0.5–30 mol percent, preferably about from 1–20 mol percent and most preferably about 10 mol percent based on total pyrrolidone. "Total pyrrolidone" refers to the 2-pyrrolidonate catalyst, 2-pyrrolidone provided as solvent to the catalyst, 2-pyrrolidone catalyst having formed an adduct or complex with an activator or initiator, and any additional monomer charged to the reaction. The alkali metal hydroxide reacts with 2-pyrrolidone to form a solution of alkali metal pyrrolidonate and water in 2-pyrrolidone. This solution is dehydrated until it contains less than about 0.1–0.2 weight percent water. Then carbon dioxide, and/or sulfur dioxide, preferably carbon dioxide, is added in an amount corresponding to about 5–80, preferably about from 10–50 mol percent of the alkali metal 2-pyrrolidonate present in solution, e.g., 10–50 mol percent, based on cationic species such as sodium or potassium. The dioxide is believed to function as an initiator or activator of polymerization. Where sulfur dioxide is used, it is desirable to operate in the lower sulfur dioxide ranges, as the use of large amounts of sulfur dioxide leads to the production of an off-color yellow product. The nitrothiophene compound accelerator is then added in a catalytically effective amount. Most preferably, the accelerator is added to the KOH-lactam solution after dehydration. In addition to carbon dioxide and/or sulfur dioxide, additional initiators and/or activators can also be present in small amounts, such as, for example, a small amount of acetic anhydride, or N-acyl lactamate, e.g., amounts of about 0.05–2.0 weight percent.

The addition of a tetra(lower alkyl) ammonium halide, preferably a chloride, can be used to particular advantage, since this activator has been found to increase the molecular weight of the polymer product, in the present process, with only a modest reduction in polymerization rate. Thus the use of this activator affords added flexibility to the process. Suitable tetra(lower alkyl) ammonium halides which can be used include, for example, tetramethyl ammonium chloride, tetraethyl ammonium chloride, (dimethyl-dipropyl) ammonium chloride, and the corresponding bromides and the like and mixtures thereof. Typically about from 0.05 to 3%, preferably about from 0.2 to 2.5% by weight, based on total lactam, of these compounds is used.

Polymerization conditions for the readily polymerizable lactams are well known and can be used for the present process, with the exception that shorter polymerization times can be used. For example, using 2-pyrrolidone, the polymerization can be conducted in the present process at temperatures in the range at about from 15° C. to 100° C., preferably about from 25° C. to 70° C., and most preferably about from 40° C. to 60° C., under a pressure ranging from subatmospheric to superatmospheric, for a period about from 2 to 20 hours, preferably about from 3 to 10 hours. Rest results in terms of optimizing process reaction time efficiency are obtained by conducting the polymerization at temperatures in the range of about from 45° to 55° C. for about from 4 to 8 hours. Higher polymerization times can be used but afford no significant advantage and hence, merely increase process time.

Also, as is well recognized by the art, in order to produce high-quality polylactam capable of being formed into fibers, filaments and yarn of commercial textile quality, high-purity lactam should be used for the polymerization. Thus, where it is desired to use the polymer product for this purpose, care should be taken to use high purity lactam. Any suitable purification procedure can be used to purify the lactam and such procedures are well known to the art.

The process of the present invention can be generally applied to the production of polymers of lactams such as, for example, polymers of 2-pyrrolidone or caprolactam, and also to the production of copolymers of lactams, such as, for example, copolymers of caprolactam or 2-pyrrolidone with each other or different lactams. Consequently, in general, and unless otherwise indicated in the above description where the terms "lactam" or "monomer" have been used, it should be appreciated that the teachings are applicable both to homopolymerization and also to the copolymerization of different lactams which copolymerize under the stated conditions of alkaline polymerization catalysis.

The polymerizations of the present invention can be carried out with various amounts of lactam, catalysts, inert organic solvents (solvents for the initial polymerization mixture but not for the desired polymer), initiators and other activators-the amount of each being properly coordinated to produce the most effective polymerization. The polymerization can be conducted as a bulk polymerization, a solution polymerization or a dispersion polymerization, and can be conducted as a batch process or a continuous process or a semi-continuous process.

The lactam starting materials are known compounds and can be obtained from commercial sources or prepared by known procedures or obvious modifications thereof (e.g., substitution of appropriate substrates and solvents).

Where typical reaction condition ranges have been given, it should be appreciated that reaction conditions both above and below these ranges can also be used though typically with poorer results or economies.

Definitions

As used herein, the following terms have the following meanings unless expressly stated to the contrary.

The term "alkyl" refers to alkyl groups having from 1 through 10 carbon atoms and includes both straight-chain and branched-chain alkyl groups. The term "lower alkyl" refers to such alkyl groups having 1 through 4 carbon atoms such as, for example, methyl, ethyl, isopropyl, and butyl.

The term "catalytically effective" in the context of the accelerators of the present invention refers to an amount of accelerator which is sufficient to significantly increase the polymerization rate with respect to a finite period time as compared with the unaccelerated polymerization.

The term "2-nitrothiophene compound" refers to compounds having the Formula I given herein on page 4, and mixtures of such compounds.

The term "total lactam" refers to the total amount of lactam in the polymerization mixture, including, for example, that present as substrate, solvent, and lactamate catalyst, etc.

The term "lactam" refers to lactams having 5 through 13 ring atoms, such as, for example, 2-pyrrolidone, epsilon-caprolactam, enantholactam, capryllactam, laurolactam, and the like.

The term "pyrrolidone" refers to 2-pyrrolidone.

As used herein, the term "shaped articles" is a generic term referring broadly to one or more useful products which are generally referred to as plastic or in that context as synthetic (e.g. synthetic fibers). The term thus includes, for example, filaments, films, sheets, containers, moldings, equipment cases and parts, etc.

A further understanding of the invention can be had from the following non-limiting examples.

EXAMPLE 1

A flask equipped with stirrer and a reduced-pressure distillation head was charged with 500 g (5.9 mols) of 2-pyrrolidone and 39.5 g of potassium hydroxide pellets (0.6 mol, 85.3% KOH). The resulting mixture was heated to about 80° C. under 1-2 mm pressure in about 10 minutes to remove water. Then the pressure was reduced further to about 0.5 mm, and the reaction mixture heated to about 113° C. to take 5-10 cc of pyrrolidone overhead. The mixture was cooled to 30° C., and carbon dioxide was added to give a potassium pyrrolidonate:carbon dioxide mol ratio of 1:0.3. (1a) A portion of the solution (50.0 g) was poured into an empty polyethylene bottle. (1b) Another portion (49.5 g) was poured into a polyethylene bottle containing 0.50 g of a 10% 2-nitrothiophene solution in pyrrolidone. Both bottles were well shaken and then held at 50° C. for 5 hours. At the end of this time the polymer was removed from the bottle, crushed and extracted with water. After drying, the polymer was weighed to determine conversion, and a viscosity measurement was made to determine molecular weight. The results are given in Run 1 and Run 4 of Table I.

The procedure described above was repeated, but modified as indicated in Table I, hereinbelow, and in some instances using tetramethyl ammonium chloride (Runs 5 and 6) or tetraethylammonium chloride (Run 7) in addition to carbon dioxide. The results of these tests are summarized in Table I hereinbelow.

TABLE 1

| | Polymerization[*1] of 2-Pyrrolidone | | | | |
|---|---|---|---|---|---|
| Run No. | $CO_2$ Mol%[*1] | Accelerator | Accel., wt.%[*2] | Polymerization time, Hrs. at 50° C. | Conversion,%[*3] | Molecular Weight[*4] |
| 1 | 3 | None | — | 5 | 8 | 320,000 |
| 2 | 3 | 2-Nitrothiophene | 0.01 | 5 | 27 | 340,000 |
| 3 | 3 | 2-Nitrothiophene | 0.05 | 5 | 53 | 255,000 |
| 4 | 3 | 2-Nitrothiophene | 0.10 | 5 | 62 | 175,000 |
| Runs using 2 weight percent TMAC[*5] in addition to $CO_2$ | | | | | | |
| 5 | 3 | None | — | 5 | 13 | >400,000 |
| 6 | 3 | 2-Nitrothiophene | 0.06 | 5 | 59 | 320,000 |
| Run using 2 weight percent TEAC[*6] in addition to $CO_2$ | | | | | | |
| 7 | 3 | 2-Nitrothiophene | 0.06 | 5 | 58 | 265,000 |

[*1] Potassium 2-pyrrolidonate in polymerization mixture is 10 mol percent based on total 2-pyrrolidone; $CO_2$, if used, is 3 mol percent, based on total 2-pyrrolidone.
[*2] Weight percent of accelerator based on total mixture.
[*3] Percent conversion is calculated as 100 × (weight of polymer)/weight of total monomer, and total monomer has been defined heretofore.
[*4] All molecular weights are reporated as weight average molecular weight as determined fromGardner viscosities (of a solution of 1.00 g of polymer in 20 ml of 88.4 wt. % aqueous formic acid), usinga Gardner viscosity-molecular weight relationship developed from specific viscosities(of 0.1 g of polymer/100 cc of m-cresol solution at 25° C.).
[*5] TMAC is tetramethyl ammonium chloride; weight percent is based on total 2-pyrrolidone.
[*6] TEAC is tetraethyl ammonium chloride; weight percent is based on total 2-pyrrolidone.

As can be seen from the above Table, the inclusion of 0.1% 2-nitrothiophene produced almost eight-fold acceleration of the polymerization in terms of conversion at five hours. Also, although the molecular weight of the product is lower, as compared with the unaccelerated polymerization, the molecular weight is still substantially above 100,000 and can be considered a very good quality polymer. Also as can be generally seen from Table I, the addition of 2% TMAC or TEAC increased molecular weight without significantly reducing conversion.

EXAMPLE 2

The polymerization is also conducted following the procedure of Example 1, except that 2-nitrothiophene is respectively replaced with 0.50 g of a 10% solution in pyrrolidone of 3-methyl-2-nitrothiophene, 4-methyl-2-nitrothiophene, 5-methyl-2-nitrothiophene; 3-ethyl-2-nitrothiophene; 4-n-propyl-2-nitrothiophene, and 5-t-butyl-2-nitrothiophene, respectively.

Obviously many modifications and variations of the invention, described hereinabove and below in the claims, can be made without departing from the essence and scope thereof.

What is claimed is:

1. A process for polymerizing a lactam to a polylactam, capable of being formed into filaments, films, or other shaped articles, which comprises polymerizing a lactam, selected from the group consisting of 2-pyrrolidone and epsiloncaprolactam, under substantially anhydrous conditions in the presence of an anionic catalyst, a polymerization activator, and a catalytically effective amount of an accelerator selected from the group consisting of nitrothiophene compounds having the formula

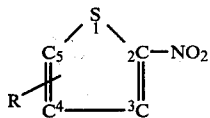

wherein R is hydrogen or lower alkyl having 1 through 4 carbon atoms;
and mixtures thereof.

2. The process of claim 1 wherein said polymerization activator is selected from the group consisting of carbon dioxide, sulfur dioxide and mixtures thereof.

3. The process of claim 2 wherein said polymerization activator is carbon dioxide.

4. The process of claim 1 wherein said lactam is 2-pyrrolidone.

5. The process of claim 1 wherein said accelerator is selected from the group consisting of 2-nitrothiophene; 3-methyl-2-nitrothiophene; 4-methyl-2-nitrothiophene; 5-methyl-2-nitrothiophene, and mixtures thereof.

6. The process of claim 5 wherein said accelerator is 2-nitrothiophene.

7. The process of claim 1 wherein said polymerization is conducted in the presence of about from 0.005 to 1% by weight, based on the total amount of lactam, of said accelerator.

8. The process of claim 7 wherein said polymerization is conducted in the presence of about from 0.01 to 0.5% by weight, based on the total amount of lactam, of said accelerator.

9. The process of claim 8 wherein said polymerization is conducted in the presence of about from 0.01 to 0.2% by weight, based on the total amount of lactam, of said accelerator.

10. The process of claim 9 wherein said lactam is 2-pyrrolidone and said accelerator is 2-nitrothiophene.

11. The process of claim 7 wherein said lactam is 2-pyrrolidone, and wherein said polymerization is conducted at a temperature in the range of about from 40° to 60° C.

12. The process of claim 11 wherein said accelerator is 2-nitrothiophene.

13. The process of claim 11 wherein said polymerization is conducted at temperatures in the range of about from 45° to 55° C.

14. The process of claim 1 wherein said anionic catalyst is a lactamate salt.

15. The process of claim 14 wherein said polymerization activator is a carboxylactamate salt prepared by the reaction of a lactamate salt with carbon dioxide.

16. The process of claim 14 wherein said lactamate salt is an alkali metal lactamate.

17. The process of claim 16 wherein said polymerization activator is an alkali metal carboxylactamate.

18. The process of claim 17 wherein said lactam is 2-pyrrolidone, said lactamate is a 2-pyrrolidonate, and said carboxylactamate is a carboxy-2-pyrrolidonate.

19. The process of claim 18 wherein said accelerator is 2-nitrothiophene and wherein said polymerization is conducted in the presence of about from 0.01 to 0.2% by weight, based on the weight of total 2-pyrrolidonate, of said 2-nitrothiophene.

20. The process of claim 2 wherein said polymerization is conducted in the presence of about from 0.2 to 2.5% by weight, based on the weight of total lactam, of a second activator selected from the group consisting of tetra(lower alkyl) ammonium halide and mixtures thereof.

21. The process of claim 20 wherein said tetra(lower alkyl) ammonium halide is a chloride or a bromide.

22. The process of claim 20 wherein said polymerization is comprises carbon dioxide.

23. The process of claim 20 wherein said second activator is selected from the group consisting of tetramethyl ammonium chloride, tetraethyl ammonium chloride and mixtures thereof.

24. The process of claim 22 wherein said lactam is 2-pyrrolidone.

25. The process of claim 24 wherein said accelerator is 2-nitrothiophene and wherein said polymerization is conducted in the presence of about from 0.01 to 0.2% by weight, based on the weight of total 2-pyrrolidonate, of said 2-nitrothiophene.

* * * * *

UNITED STATES PATENT AND TRADEMARK OFFICE
CERTIFICATE OF CORRECTION

PATENT NO. : 4,180,650
DATED : December 25, 1979
INVENTOR(S) : Henry Y. Lew

It is certified that error appears in the above-identified patent and that said Letters Patent are hereby corrected as shown below:

Col. 4, line 37, "Rest" should read --Best--.
Col. 8, line 45, "is" should read --activator is--.

Signed and Sealed this

First Day of April 1980

[SEAL]

Attest:

SIDNEY A. DIAMOND

Attesting Officer

Commissioner of Patents and Trademarks